US012617537B1

(12) United States Patent
Shi

(10) Patent No.: US 12,617,537 B1
(45) Date of Patent: May 5, 2026

(54) HYBRID TURBOFAN AND SOLID OXIDE FUEL CELL PROPULSION SYSTEM AND RELATED METHODS

(71) Applicant: The Boeing Company, Arlington, VA (US)

(72) Inventor: Mingxuan Shi, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/999,991

(22) Filed: Dec. 23, 2024

(51) Int. Cl.
B64D 27/02 (2006.01)
B64D 27/12 (2006.01)
F02K 5/00 (2006.01)
F02K 7/00 (2006.01)

(52) U.S. Cl.
CPC .......... *B64D 27/026* (2024.01); *B64D 27/12* (2013.01); *F02K 5/00* (2013.01); *F02K 7/00* (2013.01); *F05D 2220/70* (2013.01)

(58) Field of Classification Search
CPC ...... B64D 27/02; B64D 27/026; B64D 27/24; B64D 27/33
See application file for complete search history.

(56) References Cited

U.S. PATENT DOCUMENTS

2024/0287936 A1* 8/2024 Wang .................. H01M 8/0618
2024/0291000 A1* 8/2024 Wang ................. H01M 8/04111
2025/0051018 A1* 2/2025 Roberts .................. B64D 27/33

* cited by examiner

*Primary Examiner* — Nicholas McFall
*Assistant Examiner* — Justin Michael Heston
(74) *Attorney, Agent, or Firm* — Kolitch Romano Dascenzo Gates LLP

(57) ABSTRACT

Hybrid propulsion systems that utilize liquid natural gas solid oxide fuel cells in a manner practical for use in aircraft that avoid the use of heavy batteries, provide transient response times suitable for use in aircraft, and/or simplify reactant pre-conditioning systems using a compressor and turbine pair operatively coupled to the solid oxide fuel cell. Such hybrid propulsion systems for an aircraft may include a liquid natural gas solid oxide fuel cell, a motor driven by electric power from the solid oxide fuel cell, a gearbox operatively coupled to the motor, and a turbofan engine configured to generate thrust for the aircraft. The turbofan engine may be configured to provide electric power and shaft power and may include a duct fan that is operatively coupled to the motor via the gearbox, with the duct fan being driven by mechanical power from the gearbox and by the motor.

19 Claims, 4 Drawing Sheets

HYBRID TURBOFAN AND SOLID OXIDE FUEL CELL PROPULSION SYSTEM AND RELATED METHODS

FIELD

The present disclosure relates to propulsion systems, and more particularly to solid oxide fuel cell propulsion systems using liquid natural gas.

BACKGROUND

Turbofan engines are a form of jet engine that have long been used in the propulsion systems of aircraft and other vehicles or machinery. Attempts have been made to design turboshaft engines with reduced or zero carbon dioxide emissions and other greenhouse gases. One such solution, electrified propulsion, suffers from the excessive weight penalties which are too large to be feasible in the aviation industry. Attempts also have been made to incorporate fuel cells into such propulsion systems, though conventional fuel cell systems suffer from slower transient response times that are not suitable for aviation, and may disadvantageously require a complex system to pre-condition (heat and pressurize) the fuel cell reactants.

SUMMARY

Presently disclosed hybrid propulsion systems may be configured to reduce emissions and improve efficiency of overall airplane propulsion systems using alternative energy sources and configurations not contemplated in the prior art while at the same time avoiding the disadvantages of prior art systems such as excessive weight from electrified propulsion and slow transient response times. By addressing these disadvantages of prior art systems, presently disclosed hybrid propulsion systems may utilize liquid natural gas solid oxide fuel cells in a manner practical for use in aircraft. Presently disclosed hybrid propulsion systems also may be configured to simplify reactant pre-conditioning systems.

In an example, a hybrid propulsion system for an aircraft may include a liquid natural gas turbofan engine, a liquid natural gas solid oxide fuel cell, a motor driven by electric power from the solid oxide fuel cell, a gearbox operatively coupled to the motor, and a turbofan engine configured to generate thrust for the aircraft, with the turbofan engine being configured to provide electric power and shaft power. The turbofan engine may include a duct fan that is operatively coupled to the motor via the gearbox, and the duct fan may be driven by mechanical power from the gearbox and by the motor. Liquid natural gas may be used as fuel for the turbofan engine and for the solid oxide fuel cell, and the solid oxide fuel cell and the turbofan engine may be operatively coupled together to decrease a transient response time of the turbofan engine. Aircraft including a fuselage, a wing supported by the fuselage, a turbofan engine, and presently disclosed hybrid propulsion systems also are within the scope of the present disclosure.

In some examples, a hybrid propulsion system for an aircraft may include a liquid natural gas solid oxide fuel cell, a motor driven by electric power from the solid oxide fuel cell, a gearbox operatively coupled to the motor, a turbofan engine configured to generate thrust for the aircraft, and a turbo generator operatively coupled to the duct fan and a turbine downstream of the turbofan engine, the turbo generator being parallel with the solid oxide fuel cell. The turbofan engine may include a duct fan that is operatively coupled to the motor via the gearbox, and the duct fan of the turbofan engine may be driven by mechanical power from the gearbox and by the motor.

Methods of providing thrust to an aircraft via a hybrid propulsion system also are disclosed. Such methods may include generating a first amount of electric power via a liquid natural gas solid oxide fuel cell and driving a motor therewith, driving the duct fan of the turbofan engine by mechanical power from the gearbox and motor, thereby providing the thrust to the aircraft, extracting fan bleed air from the duct fan of the turbofan engine, and using the fan bleed air as source air for the solid oxide fuel cell. In such methods, the motor may be operatively coupled to a duct fan of a turbofan engine of the aircraft via a gearbox.

DESCRIPTION

Figure 1:
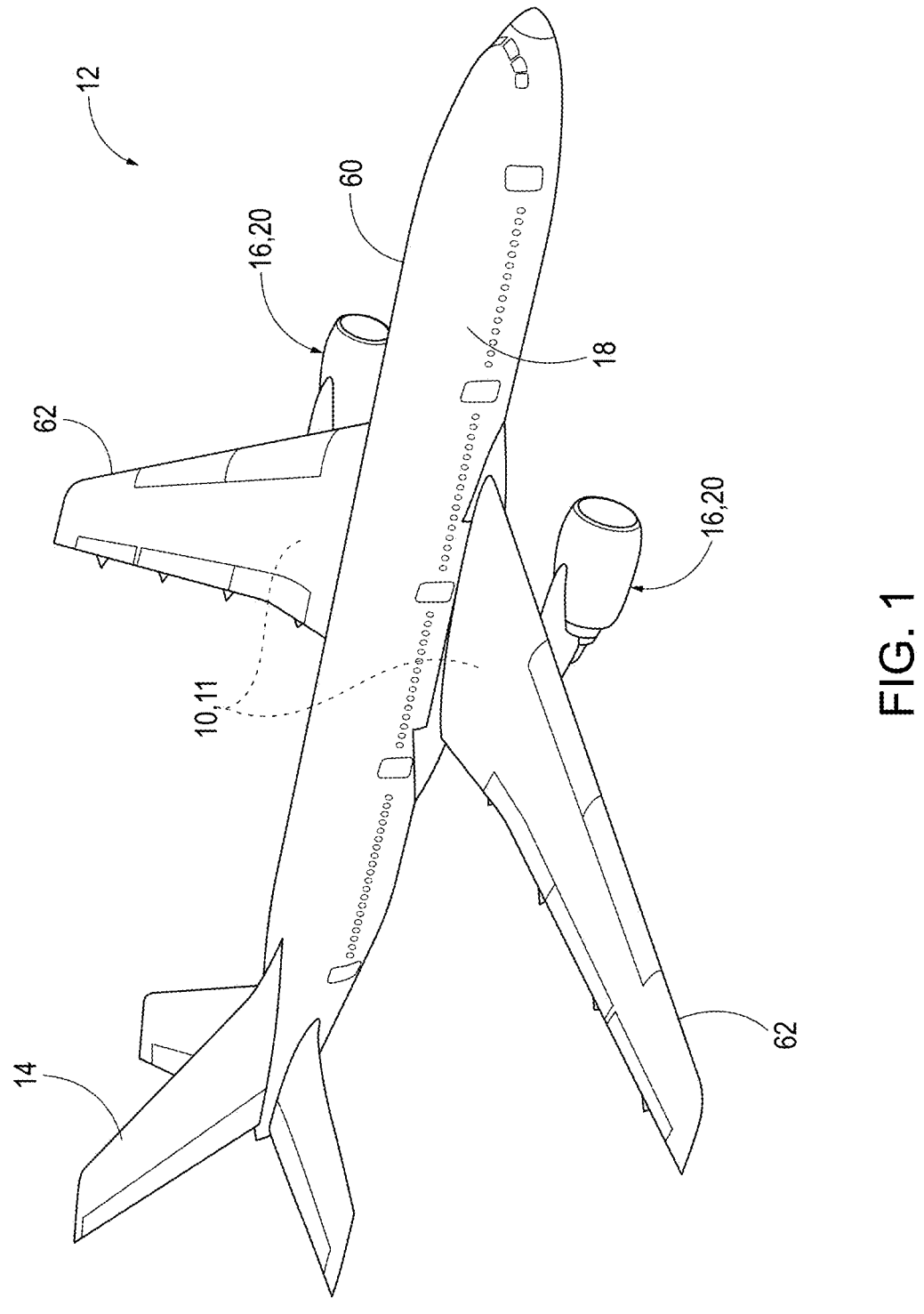
FIG. 1 is an illustration of an example aircraft according to the present disclosure.

FIG. 1 illustrates a non-exclusive example of an aircraft 12 that may comprise one or more hybrid propulsion systems 10 and/or 11 according to the present disclosure. While illustrated as a fixed-wing airliner comprising a fuselage 60 having a cabin 18, two wings 62 supported by the fuselage 60, a tail 14, and a jet engine 16 supported by each wing 62, other configurations of aircraft 12 are within the scope of the present disclosure, including, for example, rotorcraft, military craft, autonomous aircraft, etc. FIG. 1 schematically illustrates that one or more components of, and optionally all of, hybrid propulsion systems 10 and/or 11 may be supported by and/or housed in one or more of the fuselage 60 and/or the wing(s) 62 of aircraft 12.

Figure 2:
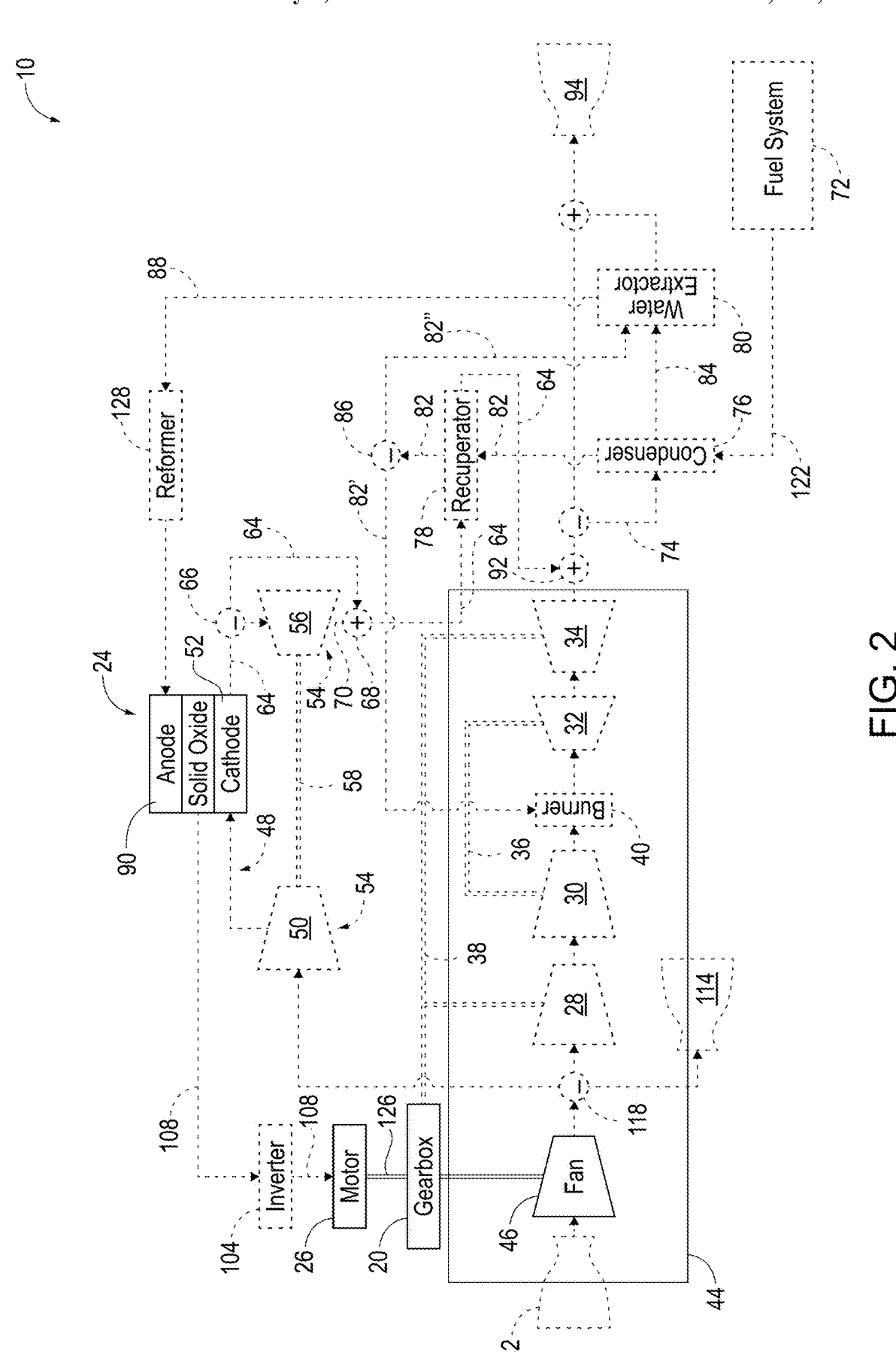
FIG. 2 is a schematic diagram representing non-exclusive examples of hybrid propulsion systems according to the present disclosure.
Figure 3:
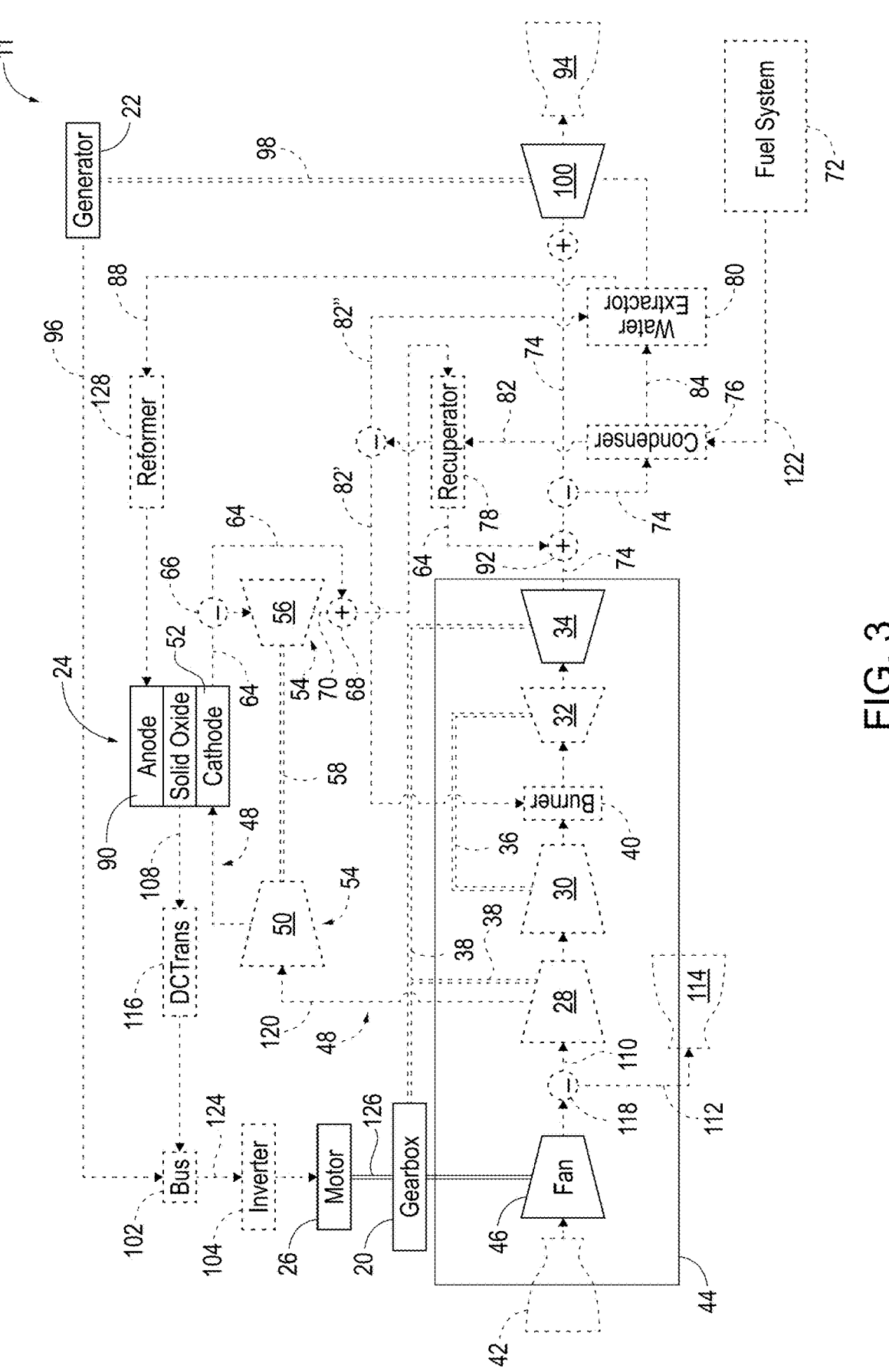
FIG. 3 is a schematic diagram representing non-exclusive examples of hybrid propulsion systems according to the present disclosure.

FIGS. 2-3 schematically represent non-exclusive examples of hybrid propulsion systems 10 and 11, according to the present disclosure. Generally, in FIGS. 2-3, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

FIG. 2 illustrates examples of hybrid propulsion systems 10 for an aircraft (e.g., aircraft 12) that combines a geared turbofan engine 44 and a liquid natural gas solid oxide fuel cell 24. Disclosed hybrid propulsion systems 10 include an electric motor 26 (which may be referred to herein simply as a motor 26) driven by electric power 108 from solid oxide fuel cell 24, a gearbox 20 operatively coupled to motor 26, and turbofan engine 44 configured to generate thrust for the aircraft. Turbofan engine 44 includes a duct fan 46 that is operatively coupled to motor 26 via gearbox 20, with duct fan 46 being mechanically driven by gearbox 20. Gearbox 20 is driven by mechanical shaft power from turbofan engine 44 and by motor 26. In some examples, turbofan engine 44 is configured to provide electric power (by way of engine exhaust 74 being used in electricity generation via solid oxide fuel cell 24) and/or shaft power. Hybrid propulsion system 10 may include a fuel system 72 configured to provide liquid natural gas to turbofan engine 44 and solid oxide fuel cell 24 (e.g., liquid natural gas is used as fuel or reactants for both turbofan engine 44 and solid oxide fuel cell 24). The use of liquid natural gas in disclosed hybrid propulsion systems 10 in combination with the arrangement of solid oxide fuel cell 24 and turbofan engine 44 creates synergistic efficiencies not contemplated in the prior art via the use of engine exhaust 74 and fuel cell exhaust 64 to pre-heat liquid natural gas to vaporize it and via the use the cold nature of liquid natural gas to condense the water out of engine exhaust 74 to create a humid environment for solid oxide fuel cell 24 to operate in.

Turbofan engine 44 generally includes a low-pressure compressor 28, a high-pressure compressor 30, a high-pressure turbine 32, and a low-pressure turbine 34. A burner 40 (e.g. a combustion chamber, or combustor) is housed within turbofan engine 44, generally between high-pressure compressor 30 and high-pressure turbine 32. A first shaft 36 may be coupled to high-pressure compressor 30 and high-pressure turbine 32 such that high-pressure compressor 30 may be driven by high-pressure turbine 32. A second shaft 38 may be coupled to low-pressure turbine 34 and low-pressure compressor 28 within turbofan engine 44 such that low-pressure compressor 28 may be driven by low-pressure turbine 34. In some examples, second shaft 38 is also coupled to gearbox 20 such that power may be extracted from low-pressure turbine 34 to operate gearbox 20.

A primary inlet 42 receives ambient air, or air from the environment, and conditions the environment air for downstream components of hybrid propulsion system 10, such as by reducing a Mach number of the environment air. The air is then sent through duct fan 46 to low-pressure compressor 28 (i.e., low-pressure compressor 28 receives air from primary inlet 42 and duct fan 46), which pressurizes (compresses) the air from primary inlet 42. Downstream of duct fan 46, a turbofan splitter 118 sends a first portion 110 of the air from duct fan 46 to low-pressure compressor 28 and a second portion 112 of the air from duct fan 46 to a secondary nozzle 114. Low-pressure compressor 28 sends the air 110 it receives from turbofan splitter 118 to high-pressure compressor 30 for further pressurization (and then to burner 40 for combustion). Turbofan splitter 118 also diverts fan bleed air 120 (also referred to herein simply as bleed air 120) along a bleed flow path 48 to a compressor 50 of a compressor and turbine pair 54. Compressor 50 is downstream from turbofan splitter 118 along bleed flow path 48 may be configured to pre-condition bleed air 120 for solid oxide fuel cell 24 by pressurizing and elevating the temperature of bleed air 120 due to compression of the bleed air. In some examples, compressor 50 is configured to primarily compress and/or pressurize bleed air 120 from duct fan 46 for solid oxide fuel cell 24. Once bleed air 120 is compressed in by compressor 50, it continues along bleed flow path 48 and is delivered to a cathode 52 of solid oxide fuel cell 24 and thus serves as a reactant, or source air, for solid oxide fuel cell 24. In other words, bleed air 120 may be extracted from turbofan engine 44 via turbofan splitter 118 to provide pre-conditioned source air to solid oxide fuel cell 24. While a primary nozzle 94 may provide a primary exit point for engine exhaust 74 to create primary thrust for the aircraft, secondary nozzle 114 may provide an exit point for second portion 112 of air from duct fan 46 to create secondary thrust for the aircraft.

Compressor 50 is part of a compressor and turbine pair 54 that also includes a turbine 56 and a shaft 58 operatively coupling the compressor and the turbine such that compressor 50 is driven by power from turbine 56. Compressor 50 is upstream of cathode 52 of solid oxide fuel cell 24 to deliver bleed air 120 to cathode 52, and turbine 56 is downstream of cathode 52 to receive fuel cell exhaust 64 from solid oxide fuel cell 24. Compressor and turbine pair 54 may serve to extract power out of fuel cell exhaust 64 exiting solid oxide fuel cell 24 to increase efficiency of hybrid propulsion system 10 rather than wasting heat from fuel cell exhaust 64. For example, compressor and turbine pair 54 may be configured to tune or control one or more conditions of fuel cell reactants (e.g., bleed air 120) for solid oxide fuel cell 24 using energy extracted from fuel cell exhaust 64. In some examples, turbine 56 is configured to limit power extraction of fuel cell exhaust 64 in order to maintain a pressure of fuel cell exhaust 64 above a desired threshold pressure. Additionally or alternatively, compressor and turbine pair 54 may be configured to fine tune the reactant conditions rather than primarily pressurizing the reactants, and thus may serve as a simplified means for pre-conditioning bleed air 120 for solid oxide fuel cell 24, as compared to conventional fuel cell systems that require complex conditioning systems.

In some examples, hybrid propulsion system 10 includes a splitter 66 upstream of turbine 56 and downstream of cathode 52 of solid oxide fuel cell 24, and/or a mixer 68 downstream of turbine 56 (and also downstream of cathode 52). In such examples, mixer 68 receives turbine exhaust 70 from turbine 56 and fuel cell exhaust 64 from solid oxide fuel cell 24 (e.g., via splitter 66) and mixes turbine exhaust 70 with fuel cell exhaust 64. Splitter 66 and mixer 68 may be configured to control an exit pressure of turbine exhaust 70 exiting turbine 56 and/or may be configured to control pre-conditioning working conditions of bleed air 120 for solid oxide fuel cell 24. Splitter 66 and mixer 68 may be installed around turbine 56 operatively coupled to solid oxide fuel cell 24, as shown in the example of hybrid propulsion system 10 shown in FIG. 2.

As noted, liquid natural gas from fuel system 72 is used for fuel/reactants for both turbofan engine 44 and solid oxide fuel cell 24. Liquid natural gas from fuel system 72 also may be used in steam generation processes within hybrid propulsion system 10. In some examples, liquid natural gas from fuel system 72 is used as a coolant to cool engine exhaust 74 from turbofan engine 44 and condense water out of engine exhaust 74. Additionally or alternatively, liquid natural gas from fuel system 72 may be pre-heated for solid oxide fuel cell 24 using engine exhaust 74. To these ends, hybrid propulsion system 10 may include a condenser 76, a recuperator 78, and/or a water extractor 80. Condenser 76 may receive liquid natural gas 122 from fuel system 72 and evaporate (e.g., gasify) the liquid natural gas to form gaseous natural gas 82 (i.e., condenser 76 may be configured to convert liquid natural gas 122 to gaseous natural gas 82). Condenser 76 also may condense liquid water out of engine exhaust 74 (e.g., water vapor) exiting turbofan engine 44, as well as cool engine exhaust 74. In other words, liquid natural gas 122 from fuel system 72 may be pre-heated by engine exhaust 74 in condenser 76 before the liquid natural gas is provided to an anode 90 of solid oxide fuel cell 24.

Recuperator 78 may be positioned downstream from condenser 76 and may receive fuel cell exhaust 64 from solid oxide fuel cell 24 (which may be via turbine 56 and mixer 68). Recuperator 78 may be configured to receive gaseous natural gas 82 from condenser 76 and to provide gaseous natural gas 82 to turbofan engine 44 (e.g., to burner 40). In some examples, recuperator 78 further heats the gaseous natural gas 82 from condenser 76 using heat from fuel cell exhaust 64. In some examples, hybrid propulsion system 10 includes a turbofan mixer 92 downstream of recuperator 78 and low-pressure turbine 34. In such examples, turbofan mixer 92 is configured to mix high-pressure fuel cell exhaust 64 into an exit stream (e.g., engine exhaust 74) exiting low-pressure turbine 34 of turbofan engine 44 after the fuel cell exhaust 64 passes through recuperator 78, which can result in more power generation (e.g., greater thrust via air exiting primary nozzle 94).

Water extractor 80 may be configured to receive air 84 with liquid water in the air from condenser 76, as well as gaseous natural gas 82. For example, a splitter 86 downstream of recuperator 78 may split gaseous natural gas 82 exiting recuperator 78 such that some gaseous natural gas 82' is directed to turbofan engine 44, while some gaseous natural gas 82" is directed to water extractor 80. Water extractor 80 may be configured to generate water vapor (i.e., steam) by extracting liquid water condensed out of engine exhaust 74 by condenser 76, and configured to add (e.g., mix) the water vapor to gaseous natural gas 82" received by water extractor 80 in order to provide humidified natural gas 88 to anode 90 of solid oxide fuel cell 24. In some examples, anode 90 has an internal reformer in the anode to convert natural gas into hydrogen-rich gas, while in other examples an external reformer 128 is provided upstream of anode 90 to convert natural gas into hydrogen-rich gas.

Electric power 108 output from solid oxide fuel cell 24, may pass through an inverter 104 before arriving at motor 26, which may be operatively coupled to gearbox 20 via a gearbox shaft 126. In this manner, electric power 108 from solid oxide fuel cell 24 may cause operation of motor 26, which powers gearbox 20, thereby driving duct fan 46 of turbofan engine 44. Again, power to drive gearbox 20 additionally may be provided via shaft 38 coupling gearbox 20 to low-pressure turbine 34.

FIG. 3 illustrates examples of hybrid propulsion systems 11, which is a modified version of hybrid propulsion system 10, and may include any of the features of hybrid propulsion system 10 described above. Similar to hybrid propulsion system 10, hybrid propulsion system 11 includes a liquid natural gas solid oxide fuel cell 24, a motor 26 driven by electric power 108 from solid oxide fuel cell 24, a gearbox 20 operatively coupled to motor 26, and a turbofan engine 44 configured to generate thrust for the aircraft. Turbofan engine 44 includes a duct fan 46 that is operatively coupled to motor 26 via gearbox 20, such that duct fan 46 of turbofan engine 44 may be driven by mechanical power from gearbox 20 and by motor 26. Hybrid propulsion system 11 also includes a turbo generator 22 operatively coupled to duct fan 46, as well as a turbine 100 downstream of turbofan engine 44, in parallel with solid oxide fuel cell 24. In this example, motor 26 may be driven simultaneously by electric power 108 from solid oxide fuel cell 24 and by electric power 96 from turbo generator 22, which can provide more flexibility in managing power use.

Similar to hybrid propulsion system 10, in hybrid propulsion system 11, downstream of duct fan 46, a turbofan splitter 118 sends a first portion 110 of air from duct fan 46 to low-pressure compressor 28 and a second portion 112 of the air from duct fan 46 to a secondary nozzle 114. Instead of diverting bleed air 120 from turbofan splitter 118 to compressor 50, hybrid propulsion system 11 diverts bleed air 120 from low-pressure compressor 28 along a bleed flow path 48 to a compressor 50. Low-pressure compressor 28, along with compressor 50 downstream from low-pressure compressor 28 along bleed flow path 48, pre-condition bleed air 120 for solid oxide fuel cell 24 by pressurizing and elevating the temperature of bleed air 120 due to compression of the bleed air. Once bleed air 120 is compressed in both low-pressure compressor 28 and compressor 50, it continues along bleed flow path 48 and is delivered to a cathode 52 of solid oxide fuel cell 24 and thus serves as a reactant, or source air, for solid oxide fuel cell 24. In other words, bleed air 120 is extracted from turbofan engine 44 after compression by low-pressure compressor 28, to provide pre-conditioned air to solid oxide fuel cell 24. Low-pressure compressor 28 also sends a portion of the air it receives from turbofan splitter 118 to a high-pressure compressor 30 for further pressurization before being sent to a burner 40.

In some examples, hybrid propulsion system 11 includes a turbofan mixer 92 downstream of a recuperator 78 and low-pressure turbine 34. In such examples, turbofan mixer 92 is configured to mix high-pressure fuel cell exhaust 64 into an exit stream (e.g., engine exhaust 74) exiting low-pressure turbine 34 of turbofan engine 44, after the fuel cell exhaust 64 passes through recuperator 78, which can result in more power generation. This may be accomplished due to fuel cell exhaust 64 having a similar pressure as that of engine exhaust 74 exiting low-pressure turbine 34. The high pressure of fuel cell exhaust 64 may be accomplished via disclosed hybrid propulsion systems 11 due to less power extraction through turbine 56, as compared to conventional hybrid gas turbine fuel cells. This mixing of fuel cell exhaust 64 back into turbofan engine 44 (e.g., mixing fuel cell exhaust 64 and engine exhaust 74) can increase the power generated by turbine 100, which receives engine exhaust 74 from turbofan engine 44. In turn, turbine 100 extracts power from engine exhaust 74 to create electric power 96 to power motor 26, such as via a shaft 98 coupling turbine 100 to turbo generator 22 to produce electric power 96.

Electric power 108 output from solid oxide fuel cell 24 may, after passing through a direct current transformer 116 that converts direct current (DC) power to alternating current (AC) power, be combined with electric power 96 from turbo generator 22 via a bus 102, resulting in combined electricity, indicated at 124. Combined electricity 124 may pass through an inverter 104 before arriving at motor 26, which may be operatively coupled to gearbox 20 via a gearbox shaft 126. In this manner, combined electricity 124 from both turbo generator 22 and solid oxide fuel cell 24 may cause operation of motor 26, which powers gearbox 20, thereby driving duct fan 46 of turbofan engine 44. Again, power to drive gearbox 20 additionally may be provided via shaft 38 coupling gearbox 20 to low-pressure turbine 34.

Electric power for motor 26 may be supplied from solid oxide fuel cell 24 on its own, from turbo generator 22 on its own, and/or from both solid oxide fuel cell 24 and turbo generator 22. In some examples, electric power for motor 26 is supplied from both solid oxide fuel cell 24 and turbo generator 22 simultaneously. Hybrid propulsion systems 11 may include an electronic engine controller configured to control the source and relative amounts of electricity supplied to motor 26. For example, the electronic engine controller may be configured to distribute a ratio of electric power load to solid oxide fuel cell 24 and turbo generator 22, thereby determining a ratio of fuel consumption of solid oxide fuel cell 24 and turbo generator 22. The ratio of fuel consumption may in turn determine a fuel ratio of an amount of fuel distributed to each of turbofan engine 44 and solid oxide fuel cell 24 by fuel system 72. Disclosed hybrid propulsion systems 11 may be configured such that a transient response time of motor 26 is sufficiently fast so as to be suitable for use in the aircraft. For example, the way solid oxide fuel cell 24 and turbofan engine 44 are operatively coupled in presently disclosed hybrid propulsion systems 11 may have the technical effect of decreasing (e.g., speeding up) the transient response time of motor 26 and/or duct fan 46 (or turbofan engine 44 as a whole), as compared to conventional systems using only fuel cells. Faster transient response in disclosed hybrid propulsion systems 10 and/or 11 can be handled by the gas turbine side (e.g., turbofan engine 44), and then after the operation of hybrid propulsion system 10, 11 is near steady state, the power split can be transferred from gas turbine side to fuel cell side (e.g., solid oxide fuel cell 24). In this manner, disclosed hybrid propulsions systems 10, 11 may be configured to take advantage of the faster transient response times of turbofan engine 44, while also obtaining fuel efficiency benefits from solid oxide fuel cell 24.

A controller such as the described electronic engine controller may be any suitable device or devices that are configured to perform the functions of the electronic engine controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

The scope of the present disclosure also includes aircraft including disclosed hybrid propulsion systems 10 and/or 11, such as aircraft 12 schematically represented in FIG. 1. Such aircraft 12 may include fuselage 60, wings 62 supported by fuselage 60, one or more jet engines 16 (which may be turbofan engines 44 as described herein), and hybrid propulsion system 10 and/or 11. In some examples, at least a portion of hybrid propulsion system 10 and/or 11 is supported by and/or housed in a wing 62. For example, solid oxide fuel cell 24, compressor and turbine pair 54, and/or recuperator 78 of hybrid propulsion system 10 and/or 11 may be housed within wing 62. In some examples, turbofan engine 44 is supported by tail 14 of fuselage 60 and/or by wing 62. In some examples, turbo generator 22, condenser 76, motor 26, and/or turbofan splitter 118 are housed inside turbofan engine 44. Implementations of aircraft 12 may include, but are not limited to, a single aisle turboelectric aircraft.

The benefits of disclosed hybrid propulsion systems 10 and/or 11 may include reduced emissions and/or improved efficiency of the overall aircraft propulsion system, as compared to prior art propulsion systems. Disclosed hybrid propulsion systems 10 and/or 11 utilize alternative energy sources and configurations not contemplated in the prior art, and are configured to avoid the use of heavy batteries, which prior art electrified systems require. Furthermore, because disclosed hybrid propulsion systems 10 and/or 11 utilize bleed air 120 as a pressurized air reactant for solid oxide fuel cell 24, complex pre-conditioning systems also may be avoided, which is another advantage over the prior art. Additionally or alternatively, hybrid propulsion systems 10 and/or 11 according to the present disclosure may provide improved transient response times by coupling operation of solid oxide fuel cell 24 and turbofan engine 44.

Figure 4:
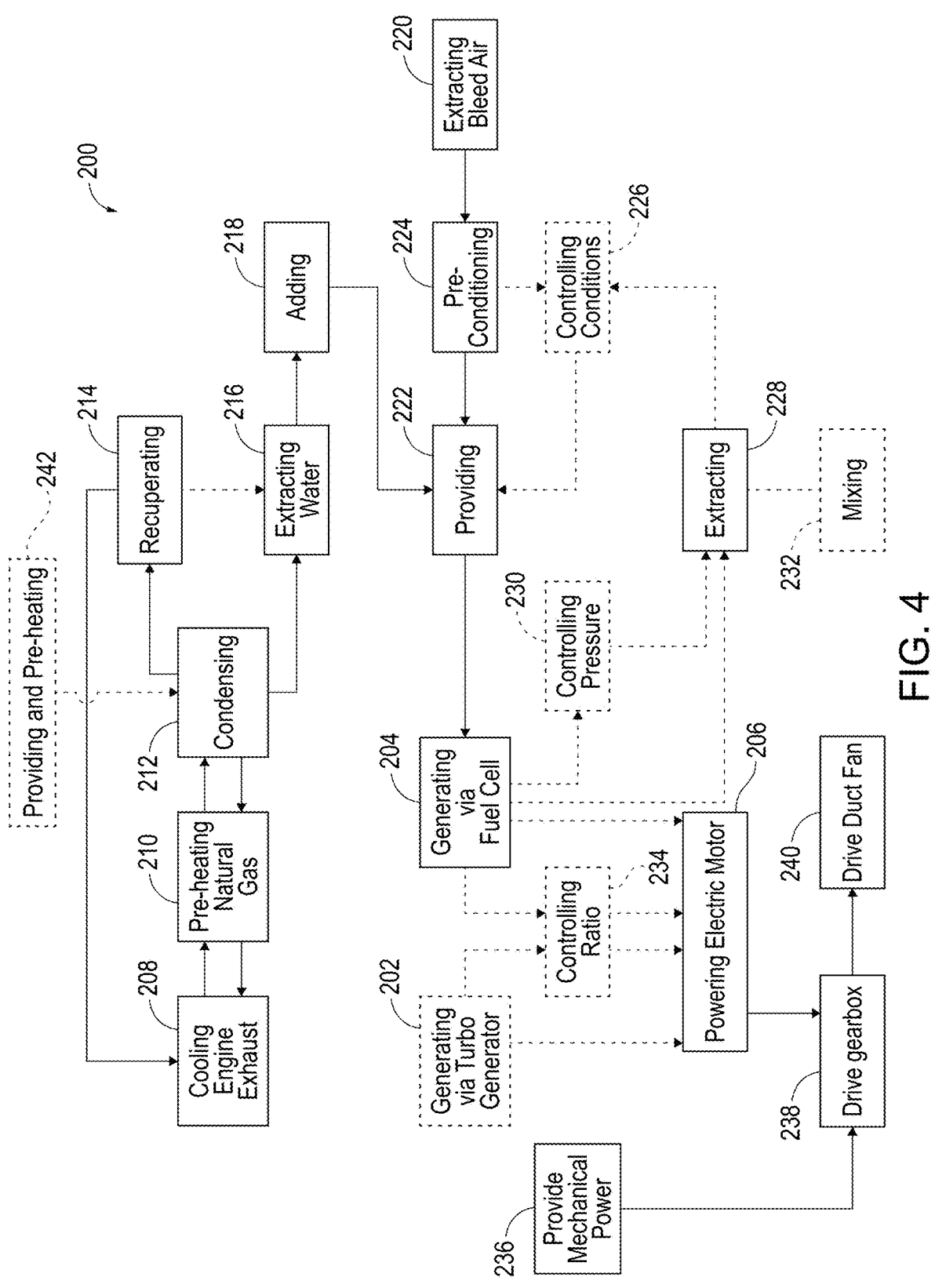
FIG. 4 is a flowchart schematically representing methods according to the present disclosure.

FIG. 4 schematically provides a flowchart that represents illustrative, non-exclusive examples of methods 200 according to the present disclosure. In FIG. 4, some steps are illustrated in dashed boxes indicating that such steps may be optional or may correspond to an optional version of a method 200 according to the present disclosure. That said, not all methods 200 according to the present disclosure are required to include the steps illustrated in solid boxes. The methods 200 and steps illustrated in FIG. 4 are not limiting and other methods and steps are within the scope of the present disclosure, including methods having greater than or fewer than the number of steps illustrated, as understood from the discussions herein.

Methods 200 of providing thrust to an aircraft (e.g., aircraft 12) via a hybrid propulsion system (e.g., hybrid propulsion system 10 and/or 11) generally include generating a first amount of electric power via a liquid natural gas solid oxide fuel cell (e.g., solid oxide fuel cell 24), at 204, and driving an electric motor (e.g., electric motor 26) with the electric power from the solid oxide fuel cell at 206, with the motor being operatively coupled to a duct fan (e.g., duct fan 46) of a turbofan engine (e.g., turbofan engine 44) of the aircraft via a gearbox (e.g., gearbox 20). The gearbox may be driven at 238, via power from the motor, and via mechanical shaft power provided at 236 (e.g., by shaft 38 driven by low-pressure turbine 34 of turbofan engine 44). Methods 200 also include driving the duct fan at 240 by mechanical power from the gearbox and motor, thereby providing the thrust to the aircraft. In some examples, methods 200 also include driving the motor via a turbo generator (e.g., turbo generator 22) simultaneously, by generating electricity via the turbo generator at 202. Thus, driving the motor at 206 may be accomplished with the first amount of electric power from the solid oxide fuel cell generated at 204 and/or with electricity generated by the turbo generator at 202. In other words, powering the electric motor at 206 may include generating and providing the first amount of electric power at 204 and/or the second amount of electric power at 202 to the electric motor at 206, optionally simultaneously. To operate the solid oxide fuel cell and the turbofan engine, liquid natural gas may be provided to the condenser and pre-heated at 242, such as being provided from a fuel system (e.g., fuel system 72).

Methods 200 may include cooling engine exhaust (e.g., engine exhaust 74) from the turbofan engine at 208 by using liquid natural gas as a coolant. Additionally or alternatively, the liquid natural gas from a fuel system (e.g., fuel system 72) may be pre-heated at 210 by the engine exhaust (e.g., the exit stream of low-pressure turbine 34). Some methods 200 include condensing, at 212 (e.g., via condenser 76), liquid natural gas from the fuel system of the hybrid propulsion system and engine exhaust from the turbofan engine, followed by recuperating, at 214 (e.g., by recuperator 78), gaseous natural gas from the condenser using fuel cell exhaust from the solid oxide fuel cell. Condensing at 212 also may include condensing liquid water from engine exhaust from the turbofan engine. In some examples, recuperating at 214 includes pre-heating gaseous natural gas using fuel cell exhaust from the solid oxide fuel cell. Some methods 200 additionally or alternatively include extracting water and generating water vapor (e.g., steam) from engine exhaust downstream of the turbofan engine at 216 (e.g., via water extractor 80), and adding the water vapor to natural gas from the fuel system to provide humidified natural gas to an anode (e.g., anode 90) of the solid oxide fuel cell at 218.

Methods 200 may include extracting bleed air from the duct fan of the turbofan engine at 220. In some examples, such as in association with disclosed hybrid propulsion systems 11, extracting bleed air at 220 is performed via the low-pressure compressor of the turbofan engine (e.g., low-pressure compressor 28). In some examples, such as in association with disclosed hybrid propulsion systems 10, extracting bleed air at 220 is performed via a turbofan splitter (e.g., turbofan splitter 118) downstream of the duct fan. The bleed air may be provided to a cathode (e.g., cathode 52) of the solid oxide fuel cell at 222, such that the fan bleed air is used as source air for the solid oxide fuel cell. Before the providing at 222, the bleed air (e.g., reactants) for the solid oxide fuel cell may be pre-conditioned at 224 by compressing and/or pressurizing the bleed air via a compressor and turbine pair of the turbofan engine (e.g., compressor and turbine pair 54), and exhaust from the solid oxide fuel cell (e.g., fuel cell exhaust 64). Some methods 200 include controlling one or more conditions of fuel reactants (e.g., bleed air) for the solid oxide fuel cell at 226, via the compressor and turbine pair, with the compressor of the compressor and turbine pair receiving bleed air from the low pressure compressor of the turbofan engine or from a turbofan splitter.

Energy may be extracted from the fuel cell exhaust at 228 to condition and/or fine tune the bleed air at the cathode of the solid oxide fuel cell, via the compressor and turbine pair. In some examples, the power extracted from the fuel cell exhaust is limited, or controlled, at 230 maintain a pressure of the fuel cell exhaust, via the compressor and turbine pair, where the turbine of the compressor and turbine pair receives fuel cell exhaust from the cathode of the solid oxide fuel cell. Additionally or alternatively, a pressure of turbine exhaust from the turbine of the compressor and turbine pair (e.g., turbine exhaust 70 from turbine 56) may be controlled, or limited, at 230, via a splitter upstream of the turbine and a mixer downstream of the turbine (e.g., splitter 66 and mixer 68). In some methods 200, fuel cell exhaust may be mixed at 232 into an exit stream exiting the low-pressure turbine of the turbofan engine, via a turbofan mixer (e.g., turbofan mixer 92) downstream of the recuperator, thereby increasing power generated by a downstream turbine operatively coupled to the turbo generator (e.g., turbine 100). In some examples, a ratio of power generated by the solid oxide fuel cell and power generated by the turbo generator is controlled at 234, such as via an electronic engine control system of the hybrid propulsion system.

Illustrative, non-exclusive examples of inventive subject matter according to the present disclosure are described in the following enumerated paragraphs:

A1. A hybrid propulsion system (10, 11) for an aircraft (12), the hybrid propulsion system (10, 11) comprising:

a liquid natural gas solid oxide fuel cell (24);

a motor (26) driven by electric power (108) from the solid oxide fuel cell (24);

a gearbox (20) operatively coupled to the motor (26); and a turbofan engine (44) configured to generate thrust for the aircraft (12), wherein the turbofan engine (44) comprises a duct fan (46) that is operatively coupled to the motor (26) via the gearbox (20), and wherein the duct fan of the turbofan engine (44) is driven by mechanical power from the gearbox (20) and by the motor (26).

A2. The hybrid propulsion system (10, 11) of paragraph A1, further comprising a turbo generator (22) operatively coupled to the duct fan (46) and a turbine downstream of the turbofan engine (44), in parallel with the solid oxide fuel cell (24).

A3. The hybrid propulsion system (10, 11) of paragraph A2, wherein the motor (26) is driven by electric power (108)

from the solid oxide fuel cell (24) and from the turbo generator (22) simultaneously.

A4. The hybrid propulsion system (10, 11) of any of paragraphs A1-A3, wherein the turbofan engine (44) is configured to provide electric power and/or shaft power.

A5. The hybrid propulsion system (10, 11) of any of paragraphs A1-A4, wherein the hybrid propulsion system (10, 11) comprises an electronic engine controller configured to distribute a ratio of electric power load to the solid oxide fuel cell (24), the motor (26), and a/the turbo generator (22), thereby determining a ratio of fuel consumption of the solid oxide fuel cell (24), the motor (26), and the turbo generator (22).

A5.1. The hybrid propulsion system (10, 11) of paragraph A5, wherein the ratio of fuel consumption determines a fuel ratio of an amount of fuel distributed to each of the turbofan engine (44) and the solid oxide fuel cell (24) by a fuel system (72).

A6. The hybrid propulsion system (10, 11) of any of paragraphs A1-A5.1, wherein fan bleed air (120) extracted from the duct fan (46) of the turbofan engine (44) is used as source air for the solid oxide fuel cell (24).

A7. The hybrid propulsion system (10, 11) of any of paragraphs A1-A6, further comprising a compressor and turbine pair (54) configured to primarily compress and/or pressurize fan bleed air (120) from the duct fan (46) of the turbofan engine (44) to pre-condition fan bleed air (120) for the solid oxide fuel cell (24).

A7.1. The hybrid propulsion system (10, 11) of paragraph A7, wherein the compressor and turbine pair (54) are configured to extract power from fuel cell exhaust (64) of the solid oxide fuel cell (24).

A8. The hybrid propulsion system (10, 11) of any of paragraphs A1-A7, comprising a/the compressor and turbine pair (54), wherein the compressor and turbine pair (54) is configured to fine tune one or more reactants for the solid oxide fuel cell (24).

A9. The hybrid propulsion system (10, 11) of any of paragraphs A1-A8, further comprising a splitter (66) and a mixer (68) configured to control pre-conditioning working conditions of fan bleed air (120) for the solid oxide fuel cell (24).

A10. The hybrid propulsion system (10, 11) of paragraph A9, wherein the splitter (66) and the mixer (68) are downstream of a cathode (52) of the solid oxide fuel cell (24).

A11. The hybrid propulsion system (10, 11) of any of paragraphs A9-A10, wherein the splitter (66) and the mixer (68) are installed around a turbine (56) operatively coupled to the solid oxide fuel cell (24).

A12. The hybrid propulsion system (10, 11) of any of paragraphs A1-A11, wherein liquid natural gas (122) is used as fuel or reactants for the turbofan engine (44) and the solid oxide fuel cell (24).

A13. The hybrid propulsion system (10, 11) of any of paragraphs A1-A12, wherein liquid natural gas (122) is used to cool engine exhaust (74) from the turbofan engine (44).

A14. The hybrid propulsion system (10, 11) of any of paragraphs A1-A13, wherein high-pressure fuel cell exhaust (64) from the solid oxide fuel cell (24) is mixed back in to engine exhaust (74) of the turbofan engine (44) via a turbofan mixer (92).

A15. The hybrid propulsion system (10, 11) of any of paragraphs A1-A14, wherein liquid natural gas (122) is used as coolant for steam generation downstream of the turbofan engine (44).

A16. The hybrid propulsion system (10, 11) of any of paragraphs A1-A15, wherein steam is generated by extracting water condensed out of engine exhaust (74) from the turbofan engine (44).

A17. The hybrid propulsion system (10, 11) of paragraph A16, further comprising a condenser (76) configured to cool engine exhaust (74) from the turbofan engine (44) and condense liquid water out of the engine exhaust (74).

A18. The hybrid propulsion system (10, 11) of paragraph A17, further comprising a water extractor (80) configured to extract liquid water from the liquid water condensed out of the engine exhaust (74) by the condenser (76).

A19. The hybrid propulsion system (10, 11) of any of paragraphs A1-A18, wherein liquid natural gas (122) from a fuel system (72) of the hybrid propulsion system (10, 11) is pre-heated by engine exhaust (74) in a/the condenser (76) before the liquid natural gas (122) is provided to an anode (90) of the solid oxide fuel cell (24).

A19.1. The hybrid propulsion system (10, 11) of paragraph A19, wherein the condenser (76) is configured to convert the liquid natural gas (122) to gaseous natural gas (82).

A19.2. The hybrid propulsion system (10, 11) of paragraph A19.1, wherein the gaseous natural gas (82) is heated by fuel cell exhaust (64) in a recuperator (78).

A19.3. The hybrid propulsion system (10, 11) of paragraph A19.2, wherein a portion of the gaseous natural gas (82) is received by a/the water extractor (80) and mixed with liquid water condensed out of the engine exhaust (74) to get humidified natural gas (88).

A19.4. The hybrid propulsion system (10, 11) of paragraph A19.3, wherein the humidified natural gas (88) is received by the anode (90) of the fuel cell.

A19.5. The hybrid propulsion system (10, 11) of any of paragraphs A1-A19.4, wherein an/the anode (90) of the solid oxide fuel cell (24) comprises an internal reformer configured to convert natural gas into hydrogen-rich gas.

A19.6. The hybrid propulsion system (10, 11) of any of paragraphs A1-A19.4, further comprising an external reformer (128) upstream of an/the anode (90) of the solid oxide fuel cell (24), wherein the external reformer (128) is configured to convert natural gas into hydrogen-rich gas.

A20. The hybrid propulsion system (10, 11) of any of paragraphs A1-A19.6, further comprising a/the fuel system (72) configured to provide liquid natural gas (122) to the turbofan engine (44) and the solid oxide fuel cell (24).

A21. The hybrid propulsion system (10, 11) of any of paragraphs A1-A20, further comprising a/the condenser (76) that receives the liquid natural gas (122) from a/the fuel system (72), condenses engine exhaust (74) from the turbofan engine (44), and mixes the gaseous natural gas (82) with condensed liquid water.

A21.1. The hybrid propulsion system (10, 11) of any of paragraphs A1-A21, wherein a/the condenser (76) gasifies the liquid natural gas (122) to form gaseous natural gas (82), and wherein the condenser (76) condenses liquid water out of engine exhaust (74) exiting the turbofan engine (44).

A22. The hybrid propulsion system (10, 11) of any of paragraphs A1-A21.1, further comprising a recuperator (78) downstream from a/the condenser (76), wherein the recuperator (78) receives a/the fuel cell exhaust (64) from the solid oxide fuel cell (24).

A23. The hybrid propulsion system (10, 11) of paragraph A22, wherein the recuperator (78) provides gaseous natural gas (82) to the turbofan engine (44).

A24. The hybrid propulsion system (10, 11) of any of paragraphs A1-A23, further comprising a water extractor (80) configured to receive air from a/the condenser (76), wherein the water extractor (80) extracts liquid water from engine exhaust (74) and adds the liquid water to liquid natural gas (122) to provide humidified natural gas (88) to an/the anode (90) of the solid oxide fuel cell (24).

A25. The hybrid propulsion system (10, 11) of any of paragraphs A1-A24, wherein the hybrid propulsion system (10, 11) is configured such that a transient response time of the duct fan (46) of the turbofan engine (44) is sufficiently fast so as to be suitable for propulsion for the aircraft (12).

A26. The hybrid propulsion system (10, 11) of any of paragraphs A1-A25, wherein the solid oxide fuel cell (24) and the turbofan engine (44) are operatively coupled together such that an/the transient response time of the turbofan engine (44) is decreased (sped up) as compared to conventional systems using only fuel cells.

B1. An aircraft (12), comprising:
a fuselage (60);
a wing (62) supported by the fuselage (60);
a turbofan engine (44); and
the hybrid propulsion system (10, 11) of any of paragraphs A1-A26.

B2. The aircraft (12) of paragraph B1, wherein at least a portion of the hybrid propulsion system (10, 11) is supported by the wing (62).

B3. The aircraft (12) of any of paragraphs B1-B2, wherein at least a portion of the hybrid propulsion system (10, 11) is housed within the wing (62).

B3.1. The aircraft (12) of paragraph B3, wherein the solid oxide fuel cell (24), a/the compressor and turbine pair (54), and/or a/the recuperator (78) of the hybrid propulsion system (10, 11) are housed within the wing (62).

B4. The aircraft (12) of paragraph B3 or B3.1, wherein a/the turbo generator (22), a/the condenser (76), a turbofan splitter (118), and/or the motor (26) are housed inside the turbofan engine (44).

B5. The aircraft (12) of any of paragraphs B1-B4, wherein the turbofan engine (44) is supported by the wing (62).

B6. The aircraft (12) of any of paragraphs B1-B5, wherein the turbofan engine (44) is supported by a tail (14) of the fuselage (60).

C1. A method (200) of providing thrust to an aircraft (12) via a hybrid propulsion system (10, 11), the method (200) comprising:
generating (204) a first amount of electric power (108) via a liquid natural gas solid oxide fuel cell (24) and driving (206) a motor (26) therewith, wherein the motor (26) is operatively coupled to a duct fan (46) of a turbofan engine (44) of the aircraft (12) via a gearbox (20); and
driving (240) the duct fan (46) of the turbofan engine (44) by mechanical power from the gearbox (20) and motor (26), thereby providing the thrust to the aircraft (12).

C2. The method (200) of paragraph C1, further comprising driving (206) the motor (26) via a turbo generator (22) simultaneously with the driving (206) the motor (26) with the first amount of electric power (108) from the solid oxide fuel cell (24).

C3. The method (200) of any of paragraphs C1-C2, further comprising extracting (220) fan bleed air (120) from the duct fan (46) of the turbofan engine (44) via a turbofan splitter (118) downstream of the duct fan (46).

C3.1. The method (200) of any of paragraphs C1-C3, further comprising extracting (220) fan bleed air (120) from the duct fan (46) of the turbofan engine (44) via a low-pressure compressor (28) of the turbofan engine (44).

C3.2. The method (200) of paragraph C3 or C3.1, further comprising using the fan bleed air (120) as source air for the solid oxide fuel cell (24).

C4. The method (200) of any of paragraphs C1-C3.2, further comprising compressing and/or pressurizing (224) the fan bleed air (120) from the duct fan (46) of the turbofan engine (44), thereby pre-conditioning one or more reactants for the solid oxide fuel cell (24), wherein the compressing and/or pressurizing (224) is performed by a compressor and turbine pair (54) of the hybrid propulsion system (10, 11).

C5. The method (200) of any of paragraphs C1-C4, further comprising extracting (228) power from fuel cell exhaust (64) of the solid oxide fuel cell (24), via a/the compressor and turbine pair (54) of the hybrid propulsion system (10, 11).

C6. The method (200) of any of paragraphs C1-C5, further comprising fine tuning one or more reactants for the solid oxide fuel cell (24), via a/the compressor and turbine pair (54) of the hybrid propulsion system (10, 11).

C7. The method (200) of any of paragraphs C1-C6, further comprising controlling (226) pre-conditioning working conditions of one or more reactants for the solid oxide fuel cell (24), via a splitter (66) and a mixer (68) of the hybrid propulsion system (10, 11).

C8. The method (200) of any of paragraphs C1-C7, further comprising providing (242) liquid natural gas (122) as fuel or reactants for the turbofan engine (44) and the solid oxide fuel cell (24).

C9. The method (200) of any of paragraphs C1-C8, further comprising cooling (208) engine exhaust (74) from the turbofan engine (44) using liquid natural gas (122).

C10. The method (200) of any of paragraphs C1-C9, further comprising mixing (232) high-pressure fuel cell exhaust (64) from the solid oxide fuel cell (24) back into the turbofan engine (44), via a/the turbofan mixer (118).

C11. The method (200) of any of paragraphs C1-C10, further comprising generating (216) steam downstream of the turbofan engine (44), using liquid natural gas (122) as coolant.

C12. The method (200) of any of paragraphs C1-C11, further comprising extracting (216) water condensed out of engine exhaust (74) from the turbofan engine (44), thereby generating steam.

C13. The method (200) of any of paragraphs C1-C12, further comprising condensing (216) liquid water from engine exhaust (74) from the turbofan engine (44).

C14. The method (200) of paragraph C13, further comprising:

pre-heating (210) liquid natural gas (122) from a fuel system (72) of the hybrid propulsion system (10, 11), via engine exhaust (74) from the turbofan engine (44) in a/the condenser (76), thereby creating gaseous natural gas (82); and heating (210) the gaseous natural gas (82) using fuel cell exhaust (64) from the solid oxide fuel cell (24) in a/the recuperator (78).

C15. The method (200) of paragraph C14, comprising:

providing a first portion the gaseous natural gas (82) to a/the water extractor (80);

mixing the first portion of the gaseous natural gas (82) with condensed out liquid water, thereby humidifying the gaseous natural gas (82);

providing the gaseous natural gas (82) to an anode (90) of the solid oxide fuel cell (24) after the mixing and humidifying.

C16. The method (200) of any of paragraphs C1-C15, wherein the method (200) is performed utilizing the hybrid propulsion system (10, 11) of any of paragraphs A1-A26.

D1. Use of the hybrid propulsion system (10, 11) of any of paragraphs A1-A26 to provide thrust to the aircraft (12).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A hybrid propulsion system for an aircraft, the hybrid propulsion system comprising:

a liquid natural gas solid oxide fuel cell;

a motor driven by electric power from the solid oxide fuel cell;

a gearbox operatively coupled to the motor; and a turbofan engine configured to generate thrust for the aircraft, wherein the turbofan engine is configured to provide electric power by way of engine exhaust from the turbofan engine being used in electricity generation via the solid oxide fuel cell, wherein the turbofan engine is further configured to provide shaft power, wherein the turbofan engine comprises a duct fan that is operatively coupled to the motor via the gearbox, wherein the duct fan of the turbofan engine is driven by mechanical power from the gearbox and by the motor, wherein liquid natural gas is used as fuel for the turbofan engine and for the solid oxide fuel cell, and wherein the solid oxide fuel cell and the turbofan engine are operatively coupled together to decrease a transient response time of the turbofan engine.

2. The hybrid propulsion system according to claim 1, wherein fan bleed air extracted from the duct fan of the turbofan engine is used as source air for the solid oxide fuel cell.

3. The hybrid propulsion system according to claim 1, further comprising a compressor and turbine pair configured to primarily compress and pressurize fan bleed air from the duct fan of the turbofan engine to pre-condition the fan bleed air for the solid oxide fuel cell, wherein the fan bleed air is extracted from the turbofan engine upstream of a low-pressure compressor of the turbofan engine.

4. The hybrid propulsion system according to claim 3, wherein the compressor and turbine pair are configured to extract power from fuel cell exhaust of the solid oxide fuel cell.

5. The hybrid propulsion system according to claim 3, further comprising a splitter and a mixer configured to control pre-conditioning working conditions of fan bleed air for the solid oxide fuel cell, wherein the splitter and the mixer are downstream of a cathode of the solid oxide fuel cell, and wherein the splitter and the mixer are installed around a turbine of the compressor and turbine pair, the turbine being operatively coupled to the solid oxide fuel cell.

6. The hybrid propulsion system according to claim 1, wherein steam is generated by extracting water condensed out of engine exhaust from the turbofan engine.

7. A hybrid propulsion system for an aircraft, the hybrid propulsion system comprising:
   a liquid natural gas solid oxide fuel cell;
   a motor driven by electric power from the solid oxide fuel cell;
   a gearbox operatively coupled to the motor;
   a turbofan engine configured to generate thrust for the aircraft, wherein the turbofan engine comprises a duct fan that is operatively coupled to the motor via the gearbox, and wherein the duct fan of the turbofan engine is driven by mechanical power from the gearbox and by the motor; and
   a turbo generator operatively coupled to the duct fan and a turbine downstream of the turbofan engine, the turbo generator being parallel with the solid oxide fuel cell.

8. The hybrid propulsion system according to claim 7, wherein the motor is driven by electric power from the solid oxide fuel cell and from the turbo generator simultaneously.

9. The hybrid propulsion system according to claim 8, wherein the hybrid propulsion system comprises an electronic engine controller configured to distribute a ratio of electric power load to the solid oxide fuel cell, the motor, and the turbo generator, thereby determining a ratio of fuel consumption of the solid oxide fuel cell, the motor, and the turbo generator.

10. The hybrid propulsion system according to claim 7, wherein fan bleed air extracted from the duct fan of the turbofan engine is used as source air for the solid oxide fuel cell.

11. The hybrid propulsion system according to claim 7, wherein high-pressure fuel cell exhaust from the solid oxide fuel cell is mixed back into the turbofan engine via a turbofan mixer to increase power generation.

12. The hybrid propulsion system according to claim 7, further comprising:
   a condenser configured to cool engine exhaust from the turbofan engine and condense liquid water out of engine exhaust; and
   a water extractor configured to extract liquid water from the liquid water condensed out of the engine exhaust by the condenser.

13. The hybrid propulsion system according to claim 12, wherein liquid natural gas from a fuel system of the hybrid propulsion system is pre-heated by engine exhaust in the condenser before the liquid natural gas is provided to an anode of the solid oxide fuel cell, wherein the condenser is configured to convert the liquid natural gas to gaseous natural gas, wherein the gaseous natural gas is heated by fuel cell exhaust in a recuperator, wherein a portion of the gaseous natural gas is received by the water extractor and mixed with the liquid water condensed out of the engine exhaust to get humidified natural gas, and wherein the humidified natural gas is received by the anode of the solid oxide fuel cell.

14. The hybrid propulsion system according to claim 7, wherein the hybrid propulsion system is configured such that a transient response time of the duct fan of the turbofan engine is sufficiently fast so as to be suitable for propulsion for the aircraft.

15. An aircraft, comprising:
   a fuselage;
   a wing supported by the fuselage;
   a turbofan engine; and
   the hybrid propulsion system according to claim 1.

16. An aircraft, comprising:
   a fuselage;
   a wing supported by the fuselage;
   a turbofan engine; and
   the hybrid propulsion system according to claim 7.

17. A method of providing thrust to an aircraft via a hybrid propulsion system, the method comprising: generating a first amount of electric power via a liquid natural gas solid oxide fuel cell and driving a motor therewith, wherein the motor is operatively coupled to a duct fan of a turbofan engine of the aircraft via a gearbox; driving the motor via a turbo generator simultaneously with driving the motor with the first amount of electric power from the solid oxide fuel cell; driving the duct fan of the turbofan engine by mechanical power from the gearbox and the motor, thereby providing the thrust to the aircraft; extracting fan bleed air from the duct fan of the turbofan engine; and using the fan bleed air as source air for the solid oxide fuel cell.

18. The method according to claim 17, further comprising:
   compressing the fan bleed air from the duct fan of the turbofan engine, thereby pre-conditioning one or more reactants for the solid oxide fuel cell, wherein the compressing is performed by a compressor and turbine pair of the hybrid propulsion system; and
   extracting power from fuel cell exhaust of the solid oxide fuel cell via the compressor and turbine pair of the hybrid propulsion system.

19. The method according to claim 17, further comprising mixing high-pressure fuel cell exhaust from the solid oxide fuel cell back into the turbofan engine, via a turbofan mixer.

* * * * *